United States Patent
Usui et al.

(10) Patent No.: US 6,800,688 B2
(45) Date of Patent: Oct. 5, 2004

(54) MODIFIED POLYOLEFIN RESIN, MODIFIED POLYOLEFIN RESIN COMPOSITION, AND USES THEREOF

(75) Inventors: Kazuhiro Usui, Iwakuni (JP); Kenichi Fujino, Iwakuni (JP); Terumasa Fujitaka, Iwakuni (JP); Tadashi Matsui, Iwakuni (JP); Hidetoshi Yoshioka, Iwakuni (JP); Shunji Sekiguchi, Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 129 days.

(21) Appl. No.: 10/168,521

(22) PCT Filed: Sep. 28, 2001

(86) PCT No.: PCT/JP01/08550
§ 371 (c)(1),
(2), (4) Date: Aug. 6, 2002

(87) PCT Pub. No.: WO02/26846
PCT Pub. Date: Apr. 4, 2002

(65) Prior Publication Data
US 2004/0059064 A1 Mar. 25, 2004

(30) Foreign Application Priority Data
Sep. 29, 2000 (JP) .......................................... 2000-300298
Sep. 27, 2001 (JP) .......................................... 2001-295941

(51) Int. Cl.$^7$ .............................................. C08F 255/00
(52) U.S. Cl. ......................... 525/69; 525/301; 525/309; 525/322; 525/324; 525/285

(58) Field of Search .................................. 525/301, 309, 525/310, 64, 69, 322, 324, 285

(56) References Cited

U.S. PATENT DOCUMENTS

| 4,094,927 A | * | 6/1978 | Harrop et al. ............... 525/210 |
| 4,957,974 A | * | 9/1990 | Ilenda et al. ................. 525/301 |
| 6,426,388 B1 | | 7/2002 | Fujino et al. |
| 6,495,629 B2 | | 12/2002 | Usui et al. |

FOREIGN PATENT DOCUMENTS

| EP | 443346 | 8/1991 |
| JP | 63-037102 | 2/1988 |
| JP | 1-282207 | 11/1989 |
| JP | 7-082328 | 3/1995 |
| JP | 7-173347 | 7/1995 |

* cited by examiner

*Primary Examiner*—Sam A. Acquah
*Assistant Examiner*—Olga Asinovsky
(74) *Attorney, Agent, or Firm*—Oblon, Spivak, McClelland, Maier & Neustadt, P.C.

(57) ABSTRACT

A resin which has excellent adhesion to nonpolar substrates, is nontacky, and has satisfactory solubility in aromatic or nonaromatic solvents and satisfactory compatibility with other resins. The resin is a modified polyolefin resin having a weight-average molecular weight of 15,000 to 150,000 obtained by modifying a polyolefin resin by grafting thereto (A) an unsaturated polycarboxylic acid or a derivative thereof and (B) a (meth)acrylic ester represented by a specific general formula, the contents of (A) and (B) in the modified polyolefin resin being 0.1 to 20 wt. % and 0.1 to 30 wt. %, respectively.

16 Claims, No Drawings

MODIFIED POLYOLEFIN RESIN, MODIFIED POLYOLEFIN RESIN COMPOSITION, AND USES THEREOF

TECHNICAL FIELD

The present invention relates to a modified polyolefin resin with improved adherence onto the surface of substrate, in particular, surface of substrate having nonpolar thermoplastic resin as a prime material and improved solubility into nonaromatic nonpolar solvent, its composition and uses.

BACKGROUND TECHNOLOGIES

Utilizing the nature to be transformed by heat, the thermoplastic resins are used as various configurations of commodities by molding into not only planar shapes such as sheets and films, but also certain shapes of spherical, cylindrical, box-like, etc. However, since the thermoplastic resins are fundamentally transparent, relatively soft and fragile, printing and painting are provided on their surfaces, for the purpose of improved protection and beautiful ornament.

The thermoplastic resins include resins with polarity and those with nonpolarity. Among nonpolar resins, polyolefinic resins such as polypropylene and polyethylene are adopted widely in recent years, because of low price and many excellent properties such as moldability, chemical resistance, water resistance, electrical characteristics and safety. Different from polar resins such as acrylic resin and polyester resin, however, the polyolefinic resin is nonpolar and crystalline, hence it is difficult to adhere ink, paint or adhesive firmly onto its surface.

In opposition to such substrates of nonpolar resins using polyolefinic resins, as resins with adherence, acid-modified polyolefin resins, from unsaturated carboxylic acid modification down, are proposed. The acid-modified polyolefin resin has adherence onto the nonpolar substrates, but its adherent strength is low and the coated film after drying has tack. For example, when acid-modified polyolefin resin is coated onto the surface of film-shaped substrate and dried to form film and then it is wound up, problems of clinging of dirts onto the surface of film and blocking after winding could not be avoided.

Moreover, the acid-modified polyolefin resin is generally poor in the solubility into solvent and the compatibility with other different types of resins, hence, usable solvents and mixable other resins were restricted on manufacturing paint for painting and printing ink, resulting in problems of difficult production of paint, ink, adhesive or the like with sufficient performance.

Moreover, in recent years, from the viewpoint of environmental problems, such resin that dissolves into solvents containing no aromatic solvent at all has been explored. However, with respect to the solvents to be used for dissolving conventional acid-modified polyolefin, the use of aromatic solvents such as toluene and xylene is essential, hence it was very difficult to dissolve into nonaromatic solvents while maintaining various physical properties such as adherence by the conventional techniques of acid-modified polyolefin.

As the means to improve the problems of solubility into solvent, compatibility with other resins, tack of dried film, and the like, a method of graft copolymerizing two or more unsaturated carboxylic acids or their derivatives with different properties onto polyolefin resin, as using unsaturated carboxylic anhydrides and nonanhydrides such as maleic anhydride and acrylic acid in combination, is disclosed in Japanese Unexamined Patent Publication Nos. Hei 9-40724, Hei 7-82328, Hei 3-227341, Hei 2-245042, etc. Moreover, in addition to the method of simple graft polymerization, a method of modification by further reacting polyester, alcohol, etc., after graft copolymerized unsaturated carboxylic acids or their derivatives such as acrylic acid and maleic anhydride onto polyolefin, is proposed in Japanese Unexamined Patent Publication No. Hei 11-217537. It is reported that the modified polyolefin resin obtainable by this method can improve the solubility into solvent, stability of solution on storing for a long term, etc.

However, when graft copolymerizing monomers of unsaturated carboxylic acids or their anhydrides such as acrylic acid and maleic acid onto polyolefin resin, in particular, polyolefin resin with high propylene content, it is known that the degradation (decrease in molecular weight) is accompanied [Journal of Polymer Science 33, 829 (1995) etc.]. With the modified polyolefin resin obtainable by modifying polyolefin resin with high propylene content by said method, decreased molecular weight was brought about, adherent strength onto nonpolar substrates was still insufficient, and also the problem of tack of formed film could not be solved.

On the other hand, it is also well known that, through the alteration of reaction conditions such as increased use level of said modifying monomer, increased molecular weight of grafting portion can be accomplished easily. In this case, however, the solubility into nonaromatic solvent improved, but sufficient adherent strength onto hard-adherent nonpolar substrates could not still be achieved, because of relative decrease in the content of polyolefin being a major component for developing adherent strength.

Moreover, when graft copolymerizing (meth)acrylic acid or its lower alkyl ester with relatively high polarity, homopolymer and copolymer ungrafting onto polyolefin skeleton were produced in large quantities, resulting in decreased solvent solubility and decreased solvent resistance of dried film etc., which did not come to the practical use.

As described, with the modified polyolefin resins obtained by conventional methods, the enhancement of adherent strength onto nonpolar resins was insufficient. In particular, onto the high-crystalline hard-adherent polyolefin moldings and untreated polyolefin resins without surface treatment for improved adherence such as corona treatment, the adherent strength was insufficient even in the case of reinforced adhesive conditions, hence more improvement in the adherent strength has been desired.

There, the purpose of the invention is to obtain a resin with excellent adherence even onto nonpolar substrates, in particular, hard-adherent nonpolar substrates without preliminary surface treatment for improving hard-adherence or adherence. Furthermore, it is to provide a resin that combines attributes of excellent solubility into nonaromatic solvent, good compatibility with other resins, and improved tack of films obtainable by coating and drying this resin itself or compositions such as paint and ink containing this resin as well.

DISCLOSURE OF THE INVENTION

As a result of diligent investigations, the inventors have found that, by combinationally using unsaturated polycarboxylic acid or its derivative and a particular (meth)acrylic ester as monomers for polyolefin resin and graft copolymerizing to modify, not only said problems are solved with use level of monomers of the order of not injuring the adherent strength, but also excellent adherent strength is exhibited even onto hard-adherent polyolefin moldings and untreated films of polyethylene and polypropylene under broad conditions from condition for adhesive treatment at high temperature to condition for adhesive treatment at low temperature of around room temperature to 100° C. Furthermore, in this case, the inventors have found that the modified resin has excellent solubility into nonaromatic solvent as well as aromatic solvent, leading to the invention.

Namely, the invention relates to
(1) a modified polyolefin resin with polyolefin resin graft modified with unsaturated polycarboxylic acid or its derivative (A) and (meth)acrylic ester (B) represented by a following general formula, with contents of (A) and (B) of 0.1 to 20% by weight and 0.1 to 30% by weight, respectively, in modified polyolefin resin, and with weight average molecular weight of 15,000 to 150,000, $$CH_2=CR_1COOR_2 \qquad \text{(Chemical formula 2)}$$

(wherein $R_1$=H or $CH_3$, $R_2=C_nH_{2n+1}$, n=integer of 8 to 18)
(2) the modified polyolefin resin of (1), wherein said unsaturated polycarboxylic acid or its derivative (A) is itaconic anhydride and/or maleic anhydride,
(3) the modified polyolefin resin of (1) or (2), wherein said (meth)acrylic ester (B) is at least one kind selected from octyl (meth)acrylate, lauryl (meth)acrylate, tridecyl (meth)acrylate and stearyl (meth)acrylate,
(4) the modified polyolefin resin of any of (1) through (3), wherein said polyolefin resin is at least one kind selected from ethylene-propylene copolymer, propylene-butene copolymer, and ethylene-propylene-butene copolymer,
(5) a modified polyolefin resin composition characterized by formulating curing agent selected from epoxy, polyisocyanate, polyol, polyamine and curing agents with those functional groups blocked with protective group, to the modified polyolefin resin of any of (1) through (4),
(6) an adhesive containing modified polyolefin resin of any of (1) through (4) or modified polyolefin resin composition of (5),
(7) a primer containing modified polyolefin resin of any of (1) through (4) or modified polyolefin resin composition of (5),
(8) a paint containing modified polyolefin resin of any of (1) through (4) or modified polyolefin resin composition of (5), and
(9) an ink containing modified polyolefin resin of any of (1) through (4) or modified polyolefin resin composition of (5). In following, the invention will be explained in detail.

The modified polyolefin resin of the invention is suitable for an adherend having thermoplastic resin, in particular, non-polar thermoplastic resin as a substrate. The nonpolar resins include polypropylene, polyethylene, ethylene-propylene copolymer, propylene-butene copolymer, ethylene-propylene-butene copolymer, terpene resin and styrene resin. The modified polyolefin resin of the invention is characterized in that the adherends having these nonpolar resins as substrates can be used, even if they may be hard-adherent ones not subject to the surface treatments with plasma, corona, etc. for improved adherence. As for the shape of adherends, it is possible to apply to any of shapes suitable for the use, from planar shapes such as sheets and films and spherical, cylindrical, box-like and other shapes down.

The polyolefin resin of the invention is composed of olefins with number of carbon atoms of not less than 2 to not more than 20, preferably not less than 2 to not more than 6 such as ethylene, propylene, butene, pentene, hexene, heptene, octene and 4-methyl-1-pentene, and, above all, α-olefins with said number of carbon atoms are preferable. Moreover, homo- or co-polymers of chain or cyclic polyenes such as cyclopentene, cyclohexene, 1,4-hexadiene, 1,5-hexadiene, divinylbenzene, 1,3-cyclopentadiene, 1,3-cyclohexadiene and 5-vinyl-2-norbornene, or styrene, substituted styrene, etc. can be used as the polyolefin resins of the invention. The proportion of these monomers in polymer can be selected arbitrarily, but, when hard-adherent nonpolar polyolefin resins such as crystalline polyethylene and polypropylene are adherends, the inventive modified polyolefin resins are preferable to be ethylene-propylene, propylene-butene and ethylene-propylene-butenecopolymer, and, in particular, the proportion of propylene in these resins is preferable to be not less than 50% to not more than 98%. If under 50%, then the adherence to adherend is poor, and, if over 98%, the flexibility is insufficient.

Upon producing the modified polyolefin resin of the invention, the molecular weight of polyolefin resin that becomes starting raw material is not particularly restricted. it is required, however, that the weight average molecular weight of modified polyolefin resin after modification becomes 15,000 to 150,000. When the molecular weight of raw material polyolefin resin is high, it is possible to adjust the molecular weight to a suitable range by degrading in the presence of heat or radical, or by degrading at the same time as modification reaction. Besides, the raw material polyolefin resins can be used solely or in combination of multiple kinds. Moreover, in the modified polyolefin resin of the invention, the raw material polyolefin is required to be not less than 50% by weight.

The unsaturated polycarboxylic acids or their derivatives (A) are unsaturated polycarboxylic acids such as maleic acid, fumaric acid, tetrahydrophthalic acid, itaconic acid, citraconic acid, crotonic acid, aconitic acid, phthalic acid, trimellitic acid and norbornenedicarboxylic acid, or their derivatives (e.g. acid anhyride, acid halide, amide, imide, ester, etc.). Thereamong, itaconic anhyride and maleic anhyride are preferable in the points of various physical properties of film of modified polyolefin resin, handling property and cost. The grafting weight of modifying component (A) in modified polyolefin resin is required to be 0.1 to 20% by weight, preferably 1 to 15% by weight and more preferably 2 to 10% by weight. If the grafting weight is lower than this range, then the solvent solubility and adherent strength onto substrates of modified polyolefin resin decrease. Also, if too high inversely, much unreacted materials generate, which is unpreferable. Besides, these modifying monomers (A) can be used solely or in combination of multiple kinds.

The (meth)acrylic ester (B) is at least one kind selected from compounds represented by a following general formula.

$$CH_2=CR_1COOR_2 \qquad \text{(Chemical formula 3)}$$

(wherein $R_1$=H or $CH_3$, $R_2=C_nH_{2n+1}$, n=integer of 8 to 18) Thereamong, octyl (meth)acrylate, lauryl (meth)acrylate, tridecyl (meth)acrylate and stearyl (meth)acrylate are preferable in the points of various physical properties of film of modified polyolefin resin and cost. In the general formula shown above, if n is smaller than 8, the solvent solubility is aggravated, and, if n is larger than 18, then the tack is caused in film, which is unpreferable. Moreover, the grafting weight of modifying monomer (B) in modified polyolefin resin is 0.1 to 30% by weight, preferably 1 to 15% by weight. If the grafting weight is lower than this range, then the solvent solubility, compatibility with other resins and adherent strength onto substrates of modified polyolefin resin decrease. Also, if too high inversely, highly reactive modifying monomer (B) forms ultrahigh-molecular weight material to aggravate the solvent solubility likewise, or production level of homopolymer and co-polymer ungrafting onto polyolefin skeleton increases, which is unpreferable. Besides, these modifying monomers (B) can be used solely or in combination of multiple kinds.

Moreover, in the invention, depending on the use and purpose, monomers other than modifying monomers (A) and (B) can be used in combination within a range of not injuring the characteristics of the invention. The usable monomers are, for example, (meth)acrylic acid, (meth)acrylic acid derivative other than (B) (cyclohexyl (meth)acrylate, hydroxyethyl (meth)acrylate, benzyl (meth)acrylate, glycidyl (meth)acrylate, isocyanate-containing (meth)acrylate, etc.), and other copolymerizable unsaturated monomers such as styrene, cyclohexyl vinyl ether, and dicyclopentadiene. By using these monomers in combination, the adherence, solvent solubility, and grafting rate of modifying monomers (A) and (B) can be enhanced further. Besides, the use level of these monomers is preferable not to exceed the sum of grafting amounts of modifying monomers (A) and (B).

It is possible to conduct the graft reaction using said modifying monomers (A) and (B) and other modifying monomers, and to obtain the modified polyolefin resin by publicly known methods. For example, solution method wherein polyolefin resin is dissolved into solvent such as toluene under heating and modifying monomers are added, melt method wherein modifying monomers are added together with molten polyolefin resin employing Banbury mixer, kneader, extruder, etc., and the like are mentioned. The method of adding modifying monomers is not minded whether they are added one by one or added in a lump.

To the modified polyolefin resin of the invention, reaction aid for improving the grafting efficiency of unsaturated carboxylic acid, stabilizer for adjusting the stability of resin, radical initiator for promoting the reaction, and the like can be formulated additionally, depending on the purpose for use.

As the reaction aids, styrene, o-methylstyrene, p-methylstyrene, α-methylstyrene, divinylbenzene, hexadiene, dicyclopentadiene, etc. are mentioned. As the stabilizers, hydroquinone, benzoquinone, nitrosophenylhydroxy compound, etc. can be mentioned. The radical initiator can be selected appropriately from publicly known products, but, for example, it is preferable to use organic peroxides such as benzoyl peroxide, dicumyl peroxide, lauroyl peroxide, di-t-butyl peroxide and cumene hydroperoxide.

The weight average molecular weight of modified polyolefin resin thus obtained is 15,000 to 150,000, preferably 30,000 to 120,000. Particularly preferable is 30,000 to 100,000. If under 15,000, then the adherent strength onto nonpolar substrates and the cohesive strength become poor, and, if over 150,000, the workability, solubility into solvent and compatibility with other resins decrease due to increased viscosity.

Besides, as the measuring methods of weight average molecular weight, GPC method and light scattering method are known, and the molecular weight in the invention is molecular weight determined by GPC method. The grafting weight % of modifying monomers (A) is determined by alkali titration method, but, in the case of imide etc. wherein the derivatives have no acidic group, it is determined by FT-IR method. Also, the grafting weight % of modifying monomers (B) is determined by FT-IR method.

Moreover, the invention relates to a modified polyolefin resin composition formulated with curing agent selected from epoxy, polyisocyanate, polyol and polyamine, or curing agent selected from ones with those functional groups blocked with protective group, to said modified polyolefin resin.

As the epoxy curing agents, 1,2,3,4-diepoxybutane, 1,2,7,8-diepoxyoctane, 1,2,9,10-diepoxydecane, vinylcyclohexene diepoxide, 1,2,5,6-diepoxycyclooctane, 3,4-epoxycyclohexylmethyl-3',4'-epoxycyclohexanecarboxylate, 1,4-butanediol glycidyl ether, 1,6-hexanediol glycidyl ether, polyethyleneglycol glycidyl ether, polypropyleneglycol glycidyl ether, glycidyl hexahydrophthalate, glycidyl ester of dimeric acid, triglycidyl isocyanurate, tetraglycidyldiaminodiphenylmethane, etc. are mentioned.

As the polyisocyanate curing agents, polyisocyanate curing agents such as ethylenediisocyanate, propylenediisocyanate, tetramethylenediisocyanate, hexamethylenediisocyanate, m-phenylenediisocyanate, p-phenylenediisocyanate, 2,4-tolylenediisocyanate, 2,6-tolylenediisocyanate, 1,5-naphthylenediisocyanate, 4,4',4"-triphenylmethanetriisocyanate, 4,4'-diphenylmethanediisocyanate, m-xylylenediisocyanate, p-xylylenediisocyanate, isophoronediisocyanate and lysineisocyanate, polyisocyanate curing agents with two or more functionality obtainable by addition reaction or addition polymerization reaction of excess of said polyisocyanate curing agent with low-molecular polyol, for example, ethylene glycol, propylene glycol, neopentyl glycol, 2,2,4-trimethyl-1,3-pentanediol, hexamethylene glycol, cyclohexanedimethanol, trimethylolpropane, glycerine, pentaerythritol or the like, polyisocyanate curing agents having Burette structure, polyisocyanate curing agents having allophanate structure, polyisocyanate curing agents having nurate structure, and curing agents with isocyanate groups of said polyisocyanate curing agents blocked with protective groups, called block isocyanates generally, are mentioned.

As the polyol curing agents, low-molecular polyol curing agents such as ethylene glycol, propylene glycol, neopentyl glycol, 2,2,4-trimethyl-1,3-pentanediol, hexamethylene glycol, cyclohexanedimethanol, trimethylolpropane, glycerine and pentaerythritol, polyethylene glycol, polypropylene glycol, polytetrahydrofuran, copolymer of ethylene oxide with propylene oxide, hydrogenated polybutadiene with hydroxyl group at end, polyesterpolyols obtainable from excess of said low-molecular polyols and dicarboxylic acids such as terephthalic acid, isophthalic acid, succinic acid, adipic acid, sebacic acid and hexahydroterephthalic acid, and the like are mentioned.

As the polyamine curing agents, diethylenetriamine, triethylenetetramine, isophoronediamine, N-aminoethylpiperazine, m-xylylenediamine, diaminodiphenylmethane, melamine, methylolated melamine, etc. are mentioned. Also, polyhydrazide compounds such as carbohydrazide, oxalic acid dihydrazide, succinic acid dihydrazide, glutamic acid dihydrazide, azelaic acid dihydrazide, undecanoic acid dihydrazide, maleic acid dihydrazide, itaconic acid dihydrazide and terephthalic acid dihydrazide can also be used similarly. Furthermore, curing agents with amino groups of said polyamine curing agents blocked with protective groups, called block amines generally, are also used.

The formulation level of said curing agents can be selected appropriately depending on the amount of functional groups (carboxyl group, acid anhydride group, hydroxyl group, etc.) in the modified polyolefin resin of the invention, but it is preferable to formulate so as the proportion of the number of said functional groups in the modified polyolefin resin that take part in the reaction to the number of functional groups (e.g. numbers of isocyanate groups, hydroxyl groups and amino groups) to become 10:1 to 1:5. In particular, a range from 5:1 to 1:2 is preferable in the points of various physical properties of film, in particular, adherence and gasohol resistance. If the formulation level of curing agent is higher than this range, the adherence decreases and, if too low, desired physical properties such as adherence, solvent resistance and water resistance cannot be obtained. Moreover, when formulating the curing agent, catalysts such as tin-based compounds can also be used in combination depending on the purpose.

The modified polyolefin resin of the invention can be used by itself or as a component for providing adherence in a variety of uses such as adhesive, primer, paint and ink, and can be used in the forms adapted to uses such as solution, powder, paste and sheet. Moreover, at that time, additives, for example, antioxidant, light stabilizer, ultraviolet absorber, pigment, dye, inorganic filler, etc. can be formulated, if need be. When using as a solution, aromatic solvents such as toluene and xylene, aliphatic solvents such as cyclohexane, methylcyclohexane, ethylcyclohexane, heptane, nonane and decane, ester solvents such as ethyl acetate and butyl acetate, ketonic solvents such as acetone, methyl ethyl ketone and methyl butyl ketone, alcoholic solvents such as methanol, ethanol, propanol and butanol, or mixtures of said solvents can be used, but, in view of the environmental problem, it is desirable not to use aromatic solvents. In particular, use of mixtures of cyclohexane-based aliphatic solvents with ester or ketonic solvents is preferable.

As the conditions of heat treatment when using the modified polyolefin resin of the invention, it is laminated onto film at a high temperature of around 170 to 180° C., or, after coating by spraying, brush coating, bar coating or the like in the state of solution, it is dried or baked at a temperature of around 80 to 100° C., or only dried at room temperature as it is for use.

When using as an adhesive or ink, not only nonpolar substrates such as polyethylene and polypropylene, but also polar substrates such as polyester, polyurethane, polyamide and aluminum are used very often in combination. Since the inventive modified polyolefin resin also has the adherence onto such polar substrates, it is suitable also for said use.

Also, when using as a primer or paint, the inventive modified polyolefin resin is excellent in the adherence to upper paint and clear coating, hence it is suitable for both polar substrates and nonpolar substrates.

When using as a paint or ink, other resins such as urethane resin, epoxy resin, acrylic resin, phenol resin, alkyd resin, polyamide resin, polyimide resin, silicone resin and nitrocellulose, being different types from polyolefin resin, may be blended, if need be.

In these uses, when blending the inventive modified polyolefin resin with said additives and other different types of resins, it is required to formulate the inventive modified polyolefin resin in amounts of at least 5% by weight or more, specifically 30% by weight or more by solids based on overall resin weight to maintain the adherence onto nonpolar or polar substrates.

Best Embodiment to Put the Invention into Practice

In following, the invention will be illustrated in more detail based on examples, but the invention is not confined thereto. Besides, the molecular weight was determined under the conditions of 40° C. and 1 ml/min, making tetrahydrofuran as a developing solvent and using RI as a detector.

EXAMPLE 1

In a four-neck flask attached with stirrer, condenser and dropping funnel, 100 g of propylene-ethylene copolymer (propylene component 97.5 mol %, ethylene component 2.5 mol %, weight average molecular weight 250,000) were dissolved into 400 g of toluene under heating. Then, while keeping the temperature of system at 110° C. and stirring, 1 g of dicumyl peroxide was added dropwise and, thereafter, the degradation treatment was performed for 1 hour. Next, 2 g of aconitic anhydride, 4 g of octyl acrylate and 0.5 g of benzoyl peroxide were added dropwise over 3 hours, respectively, and the mixture was reacted further for 1 hour. After the reaction, the reaction product was cooled to room temperature and then purified by putting into a large quantity of acetone to obtain a modified polyolefin resin with weight average molecular weight of 68,000, grafting weight of aconitic anhydride of 1.2% by weight and octyl acrylate of 2.8% by weight.

EXAMPLE 2

Into a co-rotating twin screw extruder (from Technovel Co., Ltd.) with L/D=34 and $\phi$=40 mm, 100 parts by weight of propylene-ethylene-$\alpha$-olefin copolymer (propylene component 68 mol %, ethylene component 8 mol %, butene component 24 mol %, weight average molecular weight 50,000), 8 parts by weight of maleic anhydride, 8 parts by weight of lauryl methacrylate and 1.5 parts by weight of 2,5-dimethyl-2,5-di(t-butylperoxy)hexane were charged. The reaction was conducted under the conditions of retention time of 10 minutes and barrel temperature of 180° C. (first barrel to seventh barrel), and deaeration was performed at seventh barrel to remove residual unreacted materials. The weight average molecular weight of modified polyolefin resin obtained was 49,000, the grafting weight of maleic anhydride was 5.2% by weight and the grafting weight of lauryl methacrylate was 6.2% by weight.

EXAMPLE 3

Into co-rotating twin screw extruder with L/D=34 and $\phi$=40 mm, 100 parts by weight of propylene-ethylene-$\alpha$-olefin copolymer (propylene component 68 mol %, ethylene component 8 mol %, butene component 24 mol %, weight average molecular weight 50,000), 12 parts by weight of itaconic anhydride, 6 parts by weight of tridecyl acrylate and 2 parts by weight of lauroyl peroxide were charged. The reaction was conducted under the conditions of retention time of 10 minutes and barrel temperature of 190° C. (first barrel to seventh barrel), and deaeration was performed at seventh barrel to remove residual unreacted materials. The weight average molecular weight of modified polyolefin resin obtained was 47,000, the grafting weight of itaconic anhydride was 7.5% by weight and the grafting weight of tridecyl acrylate was 4.6% by weight.

EXAMPLE 4

In a four-neck flask attached with stirrer, condenser and dropping funnel, 100 g of propylene-ethylene copolymer (propylene component 97.5 mol %, ethylene component 2.5 mol %, weight average molecular weight 250,000) were dissolved into 400 g of toluene under heating. Then, while keeping the temperature of system at 110° C. and stirring, 1 g of dicumyl peroxide was added dropwise and, thereafter, the degradation treatment was performed for 1 hour. Next, 15 g of citraconic anhydride, 20 g of stearyl methacrylate and 0.5 g of benzoyl peroxide were added dropwise over 3 hours, respectively, and the mixture was reacted further for 1 hour. After the reaction, the reaction product was cooled to room temperature and then purified by putting into a large quantity of acetone to obtain a modified polyolefin resin with weight average molecular weight of 76,000, grafting weight of citraconic anhydride of 9.4% by weight and grafting weight of stearyl methacrylate of 13.8% by weight.

EXAMPLE 5

Into a co-rotating twin screw extruder with L/D=34 and φ=40 mm, 100 parts by weight of propylene-ethylene-α-olefin copolymer (propylene component 68 mol %, ethylene component 8 mol %, butene component 24 mol %, weight average molecular weight 50,000), 4 parts by weight of itaconic anhydride, 2 parts by weight of octyl methacrylate, 2 parts by weight of stearyl methacrylate and 1.5 parts by weight of di-t-butyl peroxide were charged. The reaction was conducted under the conditions of retention time of 10 minutes and barrel temperature of 160° C. (first barrel to seventh barrel), and deaeration was performed at seventh barrel to remove residual unreacted materials. The weight average molecular weight of modified polyolefin resin obtained was 45,000, the grafting weight of itaconic anhydride was 2.6% by weight, and sum of the grafting weights of octyl methacrylate and stearyl methacrylate was 3.0% by weight.

Comparative Example 1

In a four-neck flask attached with stirrer, condenser and dropping funnel, 100 g of propylene-ethylene copolymer (propylene component 97.5 mol %, ethylene component 2.5 mol %, weight average molecular weight 250,000) were dissolved into 400 g of toluene under heating. Then, while keeping the temperature of system at 110° C. and stirring, 1 g of dicumyl peroxide was added dropwise and, thereafter, the degradation treatment was performed for 1 hour. Next, 2 g of aconitic anhydride and 0.5 g of benzoyl peroxide were added dropwise over 3 hours, respectively, and the mixture was reacted further for 1 hour. After the reaction, the reaction product was cooled to room temperature and then purified by putting into a large quantity of acetone to obtain a modified polyolefin resin with weight average molecular weight of 49,000 and grafting weight of aconitic anhydride of 1.1% by weight.

Comparative Example 2

Into a co-rotating twin screw extruder with L/D=34 and φ=40 mm, 100 parts by weight of propylene-ethylene-α-olefin copolymer (propylene component 68 mol %, ethylene component 8 mol %, butene component 24 mol %, weight average molecular weight 50,000), 50 parts by weight of itaconic anhydride, 6 parts by weight of tridecyl acrylate and 2 parts by weight of lauroyl peroxide were charged. The reaction was conducted under the conditions of retention time of 10 minutes and barrel temperature of 170° C. (first barrel to seventh barrel), and deaeration was performed at seventh barrel to remove residual unreacted materials. The weight average molecular weight of modified polyolefin resin obtained was 18,000, the grafting weight of itaconic anhydride was 22.6% by weight and the grafting weight of tridecyl acrylate was 3.1% by weight.

Comparative Example 3

Into a co-rotating twin screw extruder with L/D=34 and φ=40 mm, 100 parts by weight of propylene-ethylene-α-olefin copolymer (propylene component 68 mol %, ethylene component 8 mol %, butene component 24 mol %, weight average molecular weight 50,000), 12 parts by weight of itaconic anhydride, 200 parts by weight of tridecyl acrylate and 2 parts by weight of lauroyl peroxide were charged. The reaction was conducted under the conditions of retention time of 10 minutes and barrel temperature of 170° C. (first barrel to seventh barrel), and deaeration was performed at seventh barrel to remove residual unreacted materials. The solvent-insolbles occupied a greater part, which was impossible to use.

Comparative Example 4

Into a co-rotating twin screw extruder with L/D=34 and φ=40 mm, 100 parts by weight of propylene-ethylene-α-olefin copolymer (propylene component 68 mol %, ethylene component 8 mol %, butene component 24 mol %, weight average molecular weight 50,000), 8 parts by weight of maleic anhydride, 8 parts by weight of methyl methacrylate and 1.5 parts by weight of Perbutyl I (from Nippon Oil and Fats Co.) were charged. The reaction was conducted under the conditions of retention time of 10 minutes and barrel temperature of 150° C. (first barrel to seventh barrel), and deaeration was performed at seventh barrel to remove residual unreacted materials. The weight average molecular weight of modified polyolefin resin obtained was 47,000, the grafting weight of maleic anhydride was 4.7% by weight and the grafting weight of methyl methacrylate was 6.4% by weight.

Comparative Example 5

Into a co-rotating twin screw extruder with L/D=34 and φ=40 mm, 100 parts by weight of propylene-ethylene-α-olefin copolymer (propylene component 68 mol %, ethylene component 8 mol %, butene component 24 mol %, weight average molecular weight 50,000), 8 parts by weight of maleic anhydride, 8 parts by weight of 2-ethylstearylacrylate and 1.5 parts by weight of dicumyl peroxide were charged. The reaction was conducted under the conditions of retention time of 10 minutes and barrel temperature of 180° C. (first barrel to seventh barrel), and deaeration was performed at seventh barrel to remove residual unreacted materials. The weight average molecular weight of modified polyolefin resin obtained was 47,000, the grafting weight of maleic anhydride was 4.5% by weight and the grafting weight of 2-ethylstearyl acrylate was 6.5% by weight.

[Test 1 (Solvent Solubility)]

Of the modified polyolefin resins obtained in Examples 1 through 5 and Comparative examples 1 through 5, 10% by weight toluene solutions, 20% by weight ethylcyclohexane solutions and 20% by weight n-hexane solutions were prepared at 70 to 80° C. After cooled to room temperature, these were allowed to stand statically to evaluate the solvent solubility. The results are shown in Table 1.

(Table 1)

TABLE 1

| | Test results | | |
|---|---|---|---|
| | Solvent solubility | | |
| Sample | Toluene | Ethylcyclohexane | n-Hexane |
| Example 1 | ◯ | ◯ | ◯ |
| 2 | ◯ | ◯ | ◯ |
| 3 | ◯ | ◯ | ◯ |
| 4 | ◯ | ◯ | ◯ |
| 5 | ◯ | ◯ | ◯ |
| Comparative example 1 | Δ~× | × | × |
| 2 | Δ~× | Δ~× | Δ~× |
| 3 | × | × | × |

TABLE 1-continued

Test results

| | Solvent solubility | | |
|---|---|---|---|
| Sample | Toluene | Ethylcyclohexane | n-Hexane |
| 4 | Δ~× | Δ~× | Δ~× |
| 5 | ○~Δ | Δ | Δ |

Note)
Solvent solubility
○: Good
Δ: Turbid
×: Insoluble

[Test 2 (Adhesiveness Test)]

Of the modified polyolefin resins obtained in Examples 1 through 5 and comparative examples 1 through 5, two types of samples of 10% by weight toluene solutions and 20% by weight ethylcyclohexane/methyl ethyl ketone (=8/2) solutions were prepared, respectively, and following tests were performed. The results shown in Table 2 and Table 3. (Besides, the modified polyolefin resin obtained in Comparative example 3 was insoluble into solvent because of the presence of gel and ultrahigh molecular weight material produced by crosslinking, hence following tests could not be performed).

Tack Test

Each sample was coated onto a high-density polyethylene film and polypropylene film without surface treatment, using #20 Meyer bar, which was dried for 15 hours at room temperature. The specimen was folded so as the coated surfaces to overlap and, after pressed down lightly with fingers, it was peeled off to evaluate the tack from the peeling liability.

Adherence Test of Film at Room Temperature

For a painted film obtained by drying for 15 hours at room temperature similarly to the tack test, cellophane adhesive tape was stuck closely on the surface of film and then peeled off in the direction of 180 degrees to observe the situation of the surface of remaining coated film.

Adherence Test

Each sample was spray coated onto an ultrahigh modulus polypropylene plate so as the thickness of dried film to become not less than 10 $\mu$m and not more than 15 $\mu$m, which was dried for 30 minutes at 80° C. After the specimen was allowed to stand statically for 3 days at room temperature, slits reaching the base were engraved on the surface of coated film with cutter to make 100 cross-cuts at intervals of 1 mm. Then, cellophane adhesive tape was stuck closely thereon and peeled off five times in the direction of 180 degrees to count the number of remaining cross-cuts (X). The result was expressed as remaining number per 100 cross-cuts prepared (X/100).

Heat Seal Strength Test

Each sample was coated onto a polypropylene film after corona surface treatment using #20 Meyer bar, which was dried for 15 hours at room temperature. The coated surfaces were superposed between themselves and heat sealed under the conditions of 1.5 kg/cm², 90° C. and 10 sec using No.276 Heat Seal Tester (from Yasuda Seiki Seisakusho). Each specimen was cut so as the width to become 1 cm and peeled off under the conditions of 5 kg weight and 100 mm/min using tensile tester to measure the peeling strength thereof. Tests were made three times and the result was expressed by the average value.

(Table 2)

TABLE 2

Test results (Toluene solution)

| Sample | Adherence ×/100 | Heat seal strength (g/cm) | Tack | Adherence of film at room temperature Left: High-density Polyethylene Right; Polypropylene |
|---|---|---|---|---|
| Example 1 | 100/100 | 1000 | None | Δ, Δ |
| 2 | 100/100 | 1100 | None | ○, ○ |
| 3 | 100/100 | 1030 | None | ○, ○ |
| 4 | 100/100 | 1200 | None | Δ, Δ |
| 5 | 100/100 | 1100 | None | Δ, ○ |
| Comparative example 1 | 85/100 | 500 | Strong | ×, Δ |
| 2 | 90/100 | 520 | Strong | ×, × |
| 4 | 75/100 | 550 | Weak | ×, Δ |
| 5 | 90/100 | 820 | Strong | ×, Δ |

Adherence test of film at room temperature
○: Good
Δ: Partial peeling
×: Peeling or cohesive destruction Samples of Examples 1 through 5 after measurement of heat seal strength showed that the peeling surface was not from the substrate, but from the inside of adhesive layer.
(Table 3)

TABLE 3

Test results (Ethylcyclohexane/methyl ethyl ketone solution)

| Sample | Adherence X/100 | Heat seal strength (g/cm) | Tack | Adherence of film at room temperature Left: High-density Polyethylene Right; Polypropylene |
|---|---|---|---|---|
| Example 1 | 100/100 | 1100 | None | Δ, Δ |
| 2 | 100/100 | 1250 | None | ○, ○ |
| 3 | 100/100 | 1100 | None | ○, ○ |
| 4 | 100/100 | 1200 | None | Δ, Δ |
| 5 | 100/100 | 1050 | None | Δ, ○ |
| Comparative example 1 | 90/100 | 600 | Strong | ×, Δ |
| 2 | 90/100 | 450 | Strong | ×, × |
| 4 | 70/100 | 550 | Weak | ×, Δ |
| 5 | 85/100 | 800 | Strong | ×, Δ |

Adherence test of film at room temperature
○: Good
Δ: Partial peeling
×: Peeling or cohesive destruction Samples of Examples 1 through 5 after measurement of heat seal strength showed that the peeling surface was not from the substrate, but from the inside of adhesive layer.

[Test 3 (Paint Test)]

Of the modified polyolefin resins obtained in Examples 1 through 5 and comparative examples 1 through 5, two types of samples of 40% by weight toluene solutions and 40% by weight ethylcyclohexane/methyl ethyl ketone (=8/2) solutions were prepared, respectively, and paints were prepared using following formulation as binder resins.
Binder resin (each sample): 100 parts by weight
Alkyd resin (Phthalkyd V904, from Hitachi Chemical Co.) 15 parts by weight
TiO$_2$: 5 parts by weight
Carbon black: 1 part by weight
Rouge: 2 parts by weight
Talc: 15 parts by weight
Silica delustering agent: 5 parts by weight
After each of said compositions was kneaded for about 1 hour in a sand mill, it was diluted with toluene for toluene sample and with ethylcyclohexane/methyl ethyl ketone (=8/2) for ethylcyclohexane/methyl ethyl ketone sample so as the viscosity to become 12 to 13 sec/20° C. through Ford cup #4 for preparation. Each paint was spray coated onto an ultrahigh modulus polypropylene plate so as the thickness of dried film to become not less than 30 μm and not more than 35 μm, which was dried for 30 minutes at room temperature and then baked for 30 minutes at 80° C. After the specimen was allowed to stand statically for 48 hours at room temperature, following tests were performed. The results are shown in Table 4 and Table 5.

Adherence Test

Cross-cuts test similar to Test 2 was performed.

Warm Water Resistance Test

The specimen was soaked for 240 hours into warm water of 40° C. and the state of coated film was observed visually. In addition, the adherence test by cross-cuts test was performed.

Gasoline Resistance Test

A scratch (X mark) reaching the base was engraved on the surface of each coated film with cutter knife and the specimen was soaked into gasoline to visually observe the state of coated film.

(Table 4)

TABLE 4

Test results (Toluene solution)

| Sample | Adherence X/100 | Warm water resistance | Gasoline resistance |
|---|---|---|---|
| Example 1 | 100/100 | No abnormality 100/100 | After 2-hr soaking, no abnormality |
| 2 | 100/100 | No abnormality 100/100 | After 2-hr soaking, no abnormality |
| 3 | 100/100 | No abnormality 100/100 | After 2-hr soaking, no abnormality |
| 4 | 100/100 | No abnormality 100/100 | After 2-hr soaking, no abnormality |
| 5 | 100/100 | No abnormality 100/100 | After 2-hr soaking, no abnormality |
| Comparative example 1 | 85/100 | No abnormality 85/100 | After 2-hr soaking, no abnormality |
| 2 | 90/100 | Blister generation 90/100 | After 2-hr soaking, no abnormality |
| 4 | 80/100 | No abnormality 75/100 | After 2-hr soaking, blister generation |
| 5 | 90/100 | No abnormality 90/100 | After 2-hr soaking, no abnormality |

Because of solvent insolubility, Comparative example 3 was impossible to evaluate.

(Table 5)

TABLE 5

Test results (Ethylcyclohexane/methyl ethyl ketone solution)

| Sample | Adherence X/100 | Warm water resistance | Gasoline resistance |
|---|---|---|---|
| Example 1 | 100/100 | No abnormality 100/100 | After 2-hr soaking, no abnormality |
| 2 | 100/100 | No abnormality 100/100 | After 2-hr soaking, no abnormality |
| 3 | 100/100 | No abnormality 100/100 | After 2-hr soaking, no abnormality |
| 4 | 100/100 | No abnormality 100/100 | After 2-hr soaking, no abnormality |
| 5 | 100/100 | No abnormality 100/100 | After 2-hr soaking, no abnormality |
| Comparative example 1 | 80/100 | No abnormality 70/100 | After 2-hr soaking, no abnormality |
| 2 | 80/100 | Blister generation 75/100 | After 2-hr soaking, no abnormality |
| 4 | 70/100 | No abnormality 65/100 | After 2-hr soaking, blister generation |
| 5 | 85/100 | No abnormality 75/100 | After 2-hr soaking, no abnormality |

Because of solvent insolubility, Comparative example 3 was impossible to evaluate.

[Test 4 (Primer Test)]

Of the modified polyolefin resins obtained in Examples 1 through 5 and Comparative examples 1 through 5, two types of samples of 10% by weight toluene solutions and 20% by weight ethylcyclohexane/methyl ethyl ketone (=8/2) solutions were prepared, respectively. Each sample was spray coated onto an ultrahigh modulus polypropylene plate so as the thickness of dried film to become not less than 10 μm and not more than 15 μm, which was dried for 30 minutes at 80° C. Next, a two-component type upper white paint was spray coated so as the thickness of dried film to become not less than 45 μm and not more than 50 μm, which was allowed to stand statically for 15 minutes at room temperature and then baked for 30 minutes at 90° C. After the specimen was allowed to stand statically for 3 days at room temperature, tests similar to Test 3 were performed. The results are shown in Table 6 and Table 7.

(Table 6)

TABLE 6

Test results (Toluene solution)

| Sample | Adherence X/100 | Warm water resistance | Gasoline resistance |
|---|---|---|---|
| Example 1 | 100/100 | No abnormality 100/100 | After 2-hr soaking, no abnormality |
| 2 | 100/100 | No abnormality 100/100 | After 2-hr soaking, no abnormality |
| 3 | 100/100 | No abnormality 100/100 | After 2-hr soaking, no abnormality |
| 4 | 100/100 | No abnormality 100/100 | After 2-hr soaking, no abnormality |
| 5 | 100/100 | No abnormality 100/100 | After 2-hr soaking, no abnormality |
| Comparative example 1 | 80/100 | No abnormality 80/100 | After 2-hr soaking, no abnormality |
| 2 | 80/100 | Blister generation 80/100 | After 2-hr soaking, no abnormality |
| 4 | 80/100 | No abnormality 85/100 | After 2-hr soaking, blister generation |
| 5 | 85/100 | No abnormality 85/100 | After 2-hr soaking, no abnormality |

Because of solvent insolubility, Comparative example 3 was impossible to evaluate.

(Table 7)

TABLE 7

Test results (Ethylcyclohexane/methyl ethyl ketone solution)

| Sample | Adherence X/100 | Warm water resistance | Gasoline resistance |
|---|---|---|---|
| Example 1 | 100/100 | No abnormality 100/100 | After 2-hr soaking, no abnormality |
| 2 | 100/100 | No abnormality 100/100 | After 2-hr soaking, no abnormality |

TABLE 7-continued

Test results (Ethylcyclohexane/methyl ethyl ketone solution)

| Sample | Adherence X/100 | Warm water resistance | Gasoline resistance |
|---|---|---|---|
| 3 | 100/100 | No abnormality 100/100 | After 2-hr soaking, no abnormality |
| 4 | 100/100 | No abnormality 100/100 | After 2-hr soaking, no abnormality |
| 5 | 100/100 | No abnormality 100/100 | After 2-hr soaking, no abnormality |
| Comparative example 1 | 80/100 | No abnormality 80/100 | After 2-hr soaking, no abnormality |
| 2 | 80/100 | Blister generation 10/100 | After 2-hr soaking, no abnormality |
| 4 | 80/100 | No abnormality 85/100 | After 2-hr soaking, blister generation |
| 5 | 85/100 | No abnormality 85/100 | After 2-hr soaking, no abnormality |

Because of solvent insolubility, Comparative example 3 was impossible to evaluate.

[Test 5 (Ink Test)]

Of the modified polyolefin resins obtained in Examples 1 through 5 and Comparative examples 1 through 5, samples of 40% by weight ethylcyclohexane/butyl acetate (70/30, weight ratio) solutions were prepared, respectively, and inks were prepared using following formulation as binder resins.

Binder resin (each sample): 100 parts by weight
Urethane resin for ink: 50 parts by weight
$TiO_2$: 100 parts by weight
Ethyl acetate: 100 parts by weight
Isopropyl alcohol: 50 parts by weight Each of said compositions was milled in a paint shaker to prepare white printing ink. The printing ink obtained was coated onto each film of oriented polypropylene (OPP), high-density polyethylene (HDPE), poly(ethylene terephthalate) (PET) and nylon (NY) using #12 Meyer bar. Cellophane tape was stuck on the coated surface and the state of coated surface when peeling off rapidly was observed visually. Moreover, from the state of solution after milling and the state of dried film, the compatibility was evaluated. The results are shown in Table 8.

(Table 8)

TABLE 8

Test results

| | | Adhesiveness | | | |
|---|---|---|---|---|---|
| Sample | compatibility | OPP | HDPE | PET | NY |
| Example 1 | ○ | ○ | Δ | ○ | ○ |
| 2 | ○ | ○ | ○ | ○ | ○ |
| 3 | ○ | ○ | ○ | ○ | ○ |
| 4 | ○ | ○ | Δ | ○ | ○ |
| 5 | ○ | ○ | Δ | ○ | ○ |
| Comparative example 1 | × | ○ | × | ○ | ○ |
| 2 | Δ | Δ | × | ○ | ○ |
| 4 | × | ○ | × | ○ | ○ |
| 5 | Δ | ○ | × | ○ | ○ |

Compatibility ○: Good Δ: Turbid X: Separation to two layers
Adhesiveness ○: No peeling Δ: Partial peeling X: Almost peeling
Because of solvent insolubility, Comparative example 3 was impossible to evaluate.

[Test 6]

Into 100 g of 10% by weight toluene solution of the modified polyolefin resin obtained in Example 2 were formulated curing agents shown in table at fixed levels, which were dissolved homogeneously. With each sample, heat seal strength test similar to Test 2 and primer test similar to Test 4 were implemented. In addition, gasohol resistance test was performed using gasohol (gasoline/ethanol=9/1) in place of gasoline used in the gasoline resistance test. The results are shown in Table 9.

(Table 9)

TABLE 9

Test results

| Type of curing agent (formulation level g) | Heat seal strength. (g/cm) | Primer test | | | |
|---|---|---|---|---|---|
| | | Adherence | Warm water resistance | Gasoline resistance | Gasohol resistance |
| 1,6-hexanediol glycidyl ether (0.6) | Destruction of material | 100/100 | No abnormality 100/100 | After 2-hr soaking, no abnormality | After 2 hrs, no abnormality |
| Isophoronediisocyanate *1 (0.6) | Destruction of material | 100/100 | No abnormality 100/100 | After 2-hr soaking, no abnormality | After 2 hrs, no abnormality |
| Polytail HA*2(8.0) | Destruction of material | 100/100 | No abnormality 100/100 | After 2-hr soaking, no abnormality | After 2 hrs, no abnormality |
| m-Xylylene diamine (0.4) | Destruction of material | 100/100 | No abnormality 100/100 | After 2-hr soaking, no abnormality | After 2 hrs, no abnormality |

Note)
*1: This contains 1% dibutyl tin dilaurate.
*2: From Mitsubishi Chemical Industries Ltd. This contains 1% dibutyl tin dilaurate.

Utilizability in the Industry

The modified polyolefin resin of the invention exerts following effects over the conventional one.

(1) It has no tack and is excellent in the adherence.
(2) It is excellent in the solubility not only into aromatic solvents, but also into nonaromatic solvents.
(3) It is excellent in the compatibility with other resins of different kinds.
(4) In particular, based on that the peeling surface of sample after measurement of heat seal strength is not from substrate, but from inside of adhesive layer, it has strong adherent strength onto nonpolar substrates.

(5) When formulating curing agent, the solvent resistance (gasohol resistance) improves. In addition, in the heat seal strength, strength as high as the substrate film is destroyed is exerted.

From the points as above, The modified polyolefin resin of the invention is useful particularly for adhesive, primer, paint and ink.

SUMMARY

The invention is to provide a resin that has excellent adherence onto nonpolar substrates and combines the attributes of no tack, good solubility into aromatic solvents and non-aromatic solvents and good compatibility with other resins.

A modified polyolefin resin with polyolefin resin graft modified with unsaturated polycarboxylic acid or its derivative (A) and (meth)acrylic ester (B) represented by a specific general formula, with contents of (A) and (B) of 0.1 to 20% by weight and 0.1 to 30% by weight, respectively, in modified polyolefin resin, and with its weight average molecular weight of 15,000 to 150,000.

What is claimed is:

1. A modified polyolefin resin, which is a polyolefin resin graft modified with at least one unsaturated polycarboxylic acid or its derivative (A), at least one (meth)acrylic ester (B) represented by the following chemical formula 1, and optionally at least one monomer other than (A) and (B), with contents of (A) and (B) of 0.1 to 20% by weight and 0.1 to 30% by weight, respectively, of the modified polyolefin resin, and wherein the weight average molecular weight of the modified polyolefin resin is 15,000 to 150,000

$$CH_2=CR_1COOR_2 \quad \text{(Chemical formula 1)}$$

(wherein $R_1$=H or $CH_3$, $R_2=C_nH_{2n+1}$, n=integer of 8 to 18).

2. The modified polyolefin resin of claim 1, wherein said at least one unsaturated polycarboxylic acid or its derivative (A) is itaconic anhydride and/or maleic anhydride.

3. The modified polyolefin resin of claim 1, wherein said at least one (meth)acrylic ester (B) is at least one selected from the group consisting of octyl (meth)acrylate, lauryl (meth)acrylate, tridecyl (meth)acrylate and stearyl (meth) acrylate.

4. The modified polyolefin resin of claim 1, wherein said polyolefin resin is at least one selected from the group consisting of ethylene-propylene copolymer, propylene-butene copolymer and ethylene-propylene-butene copolymer.

5. A modified polyolefin resin composition comprising a curing agent selected from the group consisting of epoxy, polyisocyanate, polyol, polyamine and polyhydrazide, and the modified polyolefin resin of claim 1, wherein the functional group of said curing agent is optionally blocked with a protective group.

6. An adhesive containing modified polyolefin resin of claim 1.

7. A primer containing modified polyolefin resin of claim 1.

8. A paint containing modified polyolefin resin of claim 1.

9. An ink containing modified polyolefin resin of claim 1.

10. An adhesive containing the modified polyolefin resin composition of claim 5.

11. A primer comprising the modified polyolefin resin composition of claim 5.

12. A paint comprising the modified polyolefin resin composition of claim 5.

13. An ink comprising the modified polyolefin resin composition of claim 5.

14. The modified polyolefin resin of claim 1, wherein the contents of (A) is from 2 to 10% by weight of the modified polyolefin resin.

15. The modified polyolefin resin of claim 1, wherein the contents of (B) is from 1 to 15% by weight of the modified polyolefin resin.

16. The modified polyolefin resin of claim 1, wherein the weight average molecular weight of the modified polyolefin resin is 30,000 to 100,000.

* * * * *